United States Patent [19]
Brilloit

[11] 3,788,096
[45] Jan. 29, 1974

[54] CRYOGENIC GAS TRAPS

[75] Inventor: Jacques Brilloit, Grenoble, France

[73] Assignee: L'Liquide Societe Anonyme pour L'Etude et L'Exploitation des Procedes Georges Claude, Paris, France

[22] Filed: July 12, 1972

[21] Appl. No.: 271,166

[30] Foreign Application Priority Data
July 16, 1971 France .............................. 7126161

[52] U.S. Cl. .................................. 62/55.5, 62/285
[51] Int. Cl. .............................................. B01d 5/00
[58] Field of Search ..................................... 62/55.5

[56] References Cited
UNITED STATES PATENTS
3,144,756 8/1964 Arnold .................................. 62/55.5
3,371,499 3/1968 Hagenbach ........................... 62/55.5

*Primary Examiner*—William J. Wye
*Attorney, Agent, or Firm*—Young & Thompson

[57] ABSTRACT

In a cryogenic gas trap for separating out at least one constituent from a flow of gas, the coefficient of exchange between a condensation surface and a cryogenic fluid which cools said surface is substantially improved by utilizing said fluid in the two-phase gas-vapour form. The gas trap comprises a first condensation surface formed by a nest of vertical metallic tubes arranged around ant at a distance from a second condensation surface constituted by a casing 12, in the interior of which is arranged a tank 15 containing the cryogenic liquid. The tubes communicate at one extremity with an annular conduit comprised between said casing and said tank, and at the other extremity with a manifold 17. The trap may be utilized in the general field of industrial vacuum: metallurgy under vacuum, metallization, distillation and vaporization under vacuum, drying under reduced pressure.

7 Claims, 2 Drawing Figures

PATENTED JAN 29 1974

3,788,096

CRYOGENIC GAS TRAPS

The present invention relates to improvements in cryogenic gas traps.

It is known to provide a cryogenic gas trap comprising a chamber or casing into which there is introduced and then evacuated a flow of gas, from which at least one constituent is to be trapped, a receptacle or tank for a cryogenic fluid arranged inside the said chamber, a filling pipe or means for introducing the cryogenic fluid into the interior of the receptacle, a tube wound into a coil or means for evacuation of the cryogenic fluid from the receptacle, communicating with the upper portion of the receptacle and forming a trapping and condensation surface for the said constituent.

Such known traps are particularly suited to the lyophilization of aqueous and non aqueous solutions. They may however be advantageously employed in industrial installations working under vacua, such as apparatus for metallurgy, metallization, distillation under vacuum.

For these latter applications, the heat flow available per unit of condensation surface is relatively small. In other words, the heat exchanged per unit surface and per unit time between the cryogenic fluid and the flow of gas, in order to condense at least one constituent of this latter, is not considerable. In order to compensate for this drawback, it is thus necessary to increase the condensation surface so as to be able to condense an appreciable quantity of the constituent to be trapped per unit of time, an appreciable quantity of the constituent to be trapped. In the case of evacuation means constituted by a coil, this means that the length of this latter must be relatively large. This correspondingly increases the overall size and the manufacturing cost price of a trap of this kind.

The low heat flow obtained per unit of condensation surface results from the fact of a poor coefficient of exchange between the cryogenic fluid and the flow of gas, and more particularly from a bad exchange coefficient between the cryogenic fluid and the metallic condensation wall. In fact, in the case where the condensation wall defines a tank for the cryogenic fluid in the liquid form, the relative immobility of the cryogenic liquid in the tank does not facilitate a good coefficient of exchange between the said wall and the liquid.

In the case where the condensation wall forms part of an evacuation coil for the vapour form of the cryogenic fluid, the convection of the gas is not generally sufficient to obtain a good coefficient of exchange between the said wall and the vapour of the cryogenic fluid.

The present invention has therefore for its object to increase the coefficient of exchange between a condensation wall and a cryogenic fluid which cools this latter, in the case of a known cryogenic trap such as described above.

The present invention relates to a cryogenic gas trap comprising a thermally-insulated casing having a first opening for the introduction of a flow of gas of which at least one constituent is to be trapped, and a second opening for the evacuation of the flow of gas, a tank for a cryogenic fluid arranged in the interior of the said casing, means for introducing a cryogenic fluid into the interior of the tank, means for evacuating the cryogenic fluid out of the tank, communicating with the upper portion of the said tank and forming a trapping surface for the said constituent.

According to the invention, the evacuation means comprise at least one external wall arranged in the vicinity of and at a distance from the tank, forming with the wall of the tank at least one conduit, of which one extremity communicates with the upper portion of the tank by an opening forming a spillway in the said conduit for the said cryogenic fluid, at least one plurality of substantially straight tubes arranged at a distance from the external wall, of which one extremity communicates with the other extremity of the said conduit, and of which the other extremity communicates with an evacuation collector of the cryogenic fluid.

The said tubes are preferably filled, at least in part by a permeable, porous material.

This particular structure of the evacuation means of the cryogenic fluid enables this latter to circulate in the two-phase form, that is to say in the form of a gas-vapour mixture, during the major part of its travel in the interior of the evacuation means. This results therefore in a substantial improvement of the coefficient of exchange between the condensation walls of the flow of gas and the cryogenic fluid, as compared with the case in which the latter circulates essentially in the gaseous form in the said evacuation means, after having cooled in the liquid form the wall of the tank, in order to condense on this latter at least one constituent of the flow of gas.

In fact, the arrangement of the evacuation means which characterize the invention permits in the first place the putting into circulation along the external wall, in the conduit defined by this latter and the wall of the tank a gas-vapour mixture of the cryogenic fluid under forced convection. This same arrangement then makes it possible to cause the circulation in the tubes arranged round the external wall, a mixture of droplets of the cryogenic liquid and of the vapours of this latter, the proportion of gas increasing uniformly when the cryogenic fluid moves towards the downstream side of the said tube. In addition, the porous material arranged in these tubes (generally copper turnings) enables the droplets of liquid to be finely divided and the mixture of gas and vapour of the cryogenic fluid is rendered uniform. This results in a particularly high exchange coefficient between the wall of the said tubes and the cryogenic fluid which circulates in these tubes.

The heat flow available per unit surface of the external wall and per unit surface of the wall of said tubes being substantially increased, the cryogenic traps according to the invention thus possess as compared with the traps described in the main patent, for equal trap capacity, a smaller condensation surface, and for an equal condensation surface, a larger trap capacity.

In particular, it appears that the quantity of gas condensed per unit of condensation surface of a trap according to the invention is between two and three times greater than that of a trap in which the condensation surfaces are cooled by a boiling cryogenic liquid.

In addition, the external wall forming a screen for the said tank, the entry of heat by radiation towards the cryogenic liquid contained in the tank is substantially reduced. The cryogenic traps according to the invention thus have an improved thermal efficiency and a reduced consumption of cryogenic liquid.

The present invention will now be described in detail in the text which follows, reference being made to the accompanying drawings, in which.

Figure 1:
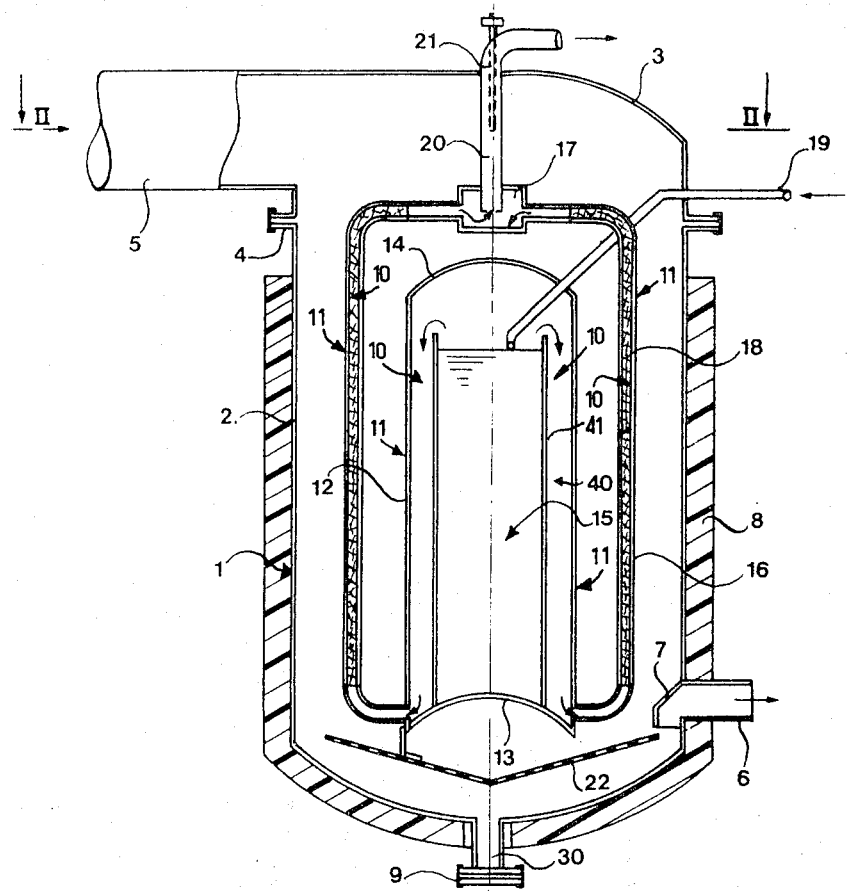
FIG. 1 represents a view in cross-section taken along the line I—I of FIG.2 of a cryogenic trap according to the invention.

A cryogenic trap according to the invention is wholly contained in a casing 1 comprising a cylindrical shell 2 having a domed end, a removable cover 3 applied in a fluid-tight manner against the said shell by means of a flange 4 and bolts (not shown).

The cover 3 is provided with a first opening or conduit 5 which may be disposed tangentially with respect to the shell 2, permitting the introduction into the casing 1 of a flow of gas of which it is desired to trap at least one constituent. The shell 2 comprises at its lower portion a section opening or a radial conduit 6 permitting the evacuation of the flow of gas which has passed into the casing 1. A baffle 7 is provided in the interior of the casing 1, on the upstream side of the conduit 6 in the direction of the flow of gas.

The casing 1 is thermally insulated by an outer layer 8 of a suitable material. The domed extremity of the casing 1 comprises an orifice 30 for the evacuation of the condensate accumulated during the trapping operation, closed during the operation of the trap by a disc 9.

The cryogenic trap also comprises a tank 15 with a cylindrical wall 41 for a cryogenic fluid in liquid form, arranged in the centre of the casing 1 and provided with a domed extremity 13, the concavity of which is turned towards the interior of the tank. A pipe 19, passing in a fluid-tight manner through the cover 3 of the casing 1 enables the cryogenic fluid to be introduced in liquid form into the interior of the tank 15. Evacuation means 10 for the cryogenic fluid contained in the tank 15 communicate with the upper portion of the tank 15. They form a trapping surface 11 working by condensation for the said constituent or constituents of the flow of gas circulating in the interior of the casing 1.

The evacuation means 10 of the cryogenic fluid comprise first of all an external wall or metallic casing 12 of cylindrical shape coaxial with the tank 15, arranged in the vicinity of and at a distance from the wall 41 of the tank 15. The casing 12 which surrounds the tank 15 is fixed at its lower extremity to the bottom 13 of the tank 15, which extends radially to the exterior of this latter. The casing 12 comprises an upper domed extremity 14 which has its concavity turned towards the exterior of the casing 12.

The tank 15 is open at its upper portion. The casing 12 and the wall 41 of the tank 15 thus define an annular conduit 40, the upper extremity of which communicates with the tank 15 through an opening comprised between the upper edge of the cylindrical wall 41 and the upper extremity 14 of the casing 12. As described below, in operation this opening forms a spillway in the conduit 40 for the cryogenic liquid contained in the tank 15. The supply pipe 19 for the cryogenic liquid passes through the casing 12 in a fluid-tight manner.

The evacuation means 10 of the cryogenic fluid also comprises a plurality of metal tubes 16, substantially vertical and distributed round the tank 15 and the casing 12, arranged at a distance from this latter. The lower extremity of each tube 16 is welded to the lower portion of the casing 12 and communicates with the lower extremity of the annular conduit 40. The upper extremity of each tube 16 is welded to and communicates with an evacuation manifold 17 for the cryogenic fluid. This manifold has the shape of a cylindrical box arranged in the centre and in the upper portion of the casing 1, above the upper extremity 14 of the casing 12. Each tube 16 is filled in its vertical portion with a metallic porous material 18 (copper turnings for example). The tubes 16 may comprise externally radial and/or longitudinal fins mounted in the mass of each tube or added on. An axial pipe 20 passing in a fluid-tight manner through the cover 3 and penetrating into the interior of the manifold 17 permits the evacuation of the cryogenic fluid in vapour form which has collected in the manifold 17.

Temperature-regulation means enable the levels of temperature obtained at each of the points of the condensation surface of the cryogenic trap to be regulated. These means comprise a temperature probe 21 arranged in the interior of the evacuation pipe 20, and in consequence on the downstream side of the manifold, in the direction of circulation of the cryogenic fluid.

They also comprise a gate-valve permitting the regulation of the flow-rate of cryogenic liquid introduced into the tank 15, arranged on the supply pipe (not shown), and a regulating box (also not shown).

Figure 2:
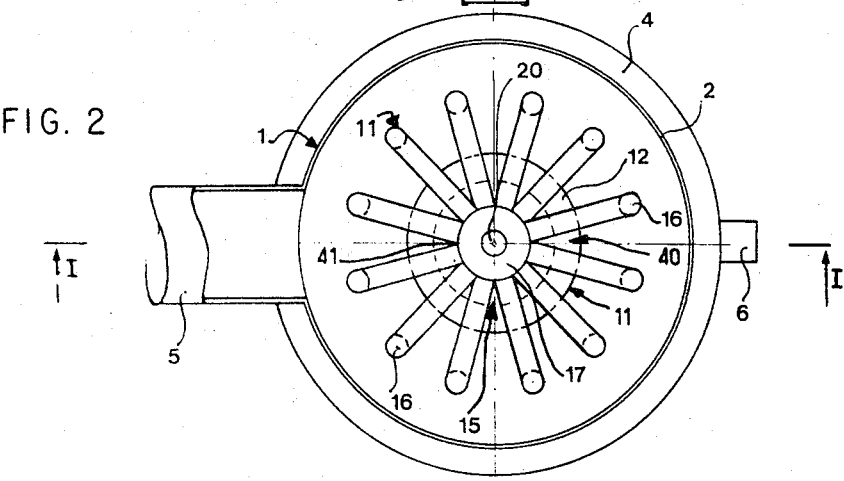
FIG. 2 shows a view in cross-section taken along the line II—II of FIG.1, of the same cryogenic trap.

The cryogenic trap in accordance with FIGS.1 and 2 also comprises a device (not shown) which enables the condensates trapped during operation to be liquefied or vaporized. This device may be a spraying rack arranged above the manifold 17 and enabling a hot fluid to be introduced into the casing 1. This device may also be a tube arranged inside the casing 1, in which circulates a hot fluid, this avoiding mixture of the said fluid with the condensates and enables the latter to be recovered in the pure state.

A grid 22 is arranged in the interior of the casing 1, below the casing 12, which makes it possible to prevent the solid condensates from coming into contact with the bottom of the casing 1, hotter than these latter and thus prevents increasing their vapour tension inside the trap.

The trap which has just been described may be integrated, for example, on the pumping circuit of a chamber, just before the primary pumping set, in which case the conduit communicates with the primary pumping intake and the conduit 5 with the secondary pump.

In operation, especially in the case of a trap which forms part of a pumping circuit as previously described, the tank 15 is supplied with cryogenic liquid, such as liquid nitrogen, through the pipe 19, the level of this latter being maintained by itself at a maximum value corresponding to the upper edge of the wall 41 of the tank 15.

As the cryogenic liquid is boiling, the vapours produced pass into the annular conduit 40, carrying away a part of the liquid contained in the tank 15. This latter thus overflows into the conduit 40 above the upper edge of the cylindrical wall 41. The gas-liquid mixture thus obtained then circulates in a generally falling direction inside the conduit 40. There is thus obtained a slightly turbulent flow of the cryogenic fluid in the two-phase form, which has the effect of cooling the casing 12 to a temperature level substantially close to the boiling point of the cryogenic liquid.

The cryogenic fluid in the two-phase form then passes into the tubes 16. The droplets of liquid carried away by the cryogenic fluid vapours are then finely divided by passing through the copper turnings 18. There is thus obtained a very homogeneous fog of the cryogenic fluid in the two-phase form, which has the particular feature of having a high coefficient of exchange with the wall of the tubes 16.

During the progress of the upward movement of the said fog in the interior of the tubes 16, the proportion of vapour of the cryogenic fluid uniformly increases. The cryogenic fluid in vapour form obtained at the upper portion of the tubes 16 is then progressively heated in the latter part of these tubes. It is collected in the gaseous form, at least partly heated, in the manifold 17 and is then evacuated from the trap by the pipe 20. The outer surface of the tubes 16 is thus cooled to a level of temperature higher than that of the outer surface of the casing 12.

In operation, the temperature levels respectively existing in the casing 12 and the wall of the tubes 16 are constantly regulated through the intermediary of the temperature probe 21 which enables the flow-rate of cryogenic fluid introduced into the tank 15 to be adjusted.

When the temperatures of the casing 12 and the tubes 16 increase with respect to the desired rated values, the flow of cryogenic liquid into the tank 15 is increased. When these same temperatures fall with respect to the desired rated values, the flow-rate introduced is diminished.

With regard to the flow of gas of which certain constituents are to be trapped, this passes into the casing 1 through the conduit 5 above the casing 12 and the tank 15. It is pre-cooled by contact with the tubes 16; certain impurities may already be condensed and trapped on the outer surface of the tubes 16, at the highest temperature level. The flow of gas is then cooled by contact with the casing 12; other impurities are condensed and trapped at the lowest temperature level on the outer surface of the casing 12, and the flow of gas then leaves the trap through the conduit 6.

During the operation of the trap, the thickness of the layer of condensed substances increases, as does also their residual pressure at the outlet of the trap. The limiting values permitted for the residual pressures of the trapped substances determine the saturation time of the trap. At the end of this period, the trap is isolated, the evacuation orifice 30 of the condensates is opened, and the device is set in operation, which enables the condensates to be liquefied or vaporized, this device being, as previously described, a tube arranged in the interior of the casing 1, in which a hot fluid circulates. The condensate melts or is vaporized and escapes through the orifices 6 or the orifice 30. The trap can thus be put back into operation.

By way of example, with a trap as shown in FIGS.1 and 2, supplied with liquid nitrogen, the following temperature levels were obtained:

- outer surface of the casing 12: 80°K;
- Outer surface of the tubes 16: 90°K.

The performances of a trap of this kind are as follows:

- Rated capacity in condensate: 50 kg.
- Consumption of liquid nitrogen: 8 to 10 kg. per kg. of water trapped.

The cryogenic traps described may be advantageously employed in the field of industrial vacuum: metallurgy under vacuum, metallization, distillation and vaporization under vacuum, and drying under reduced pressure.

What I claim is:

1. A cryogenic gas trap of the kind comprising a thermally insulated casing having a first opening for the introduction of a flow of gas of which at least one constituent is to be trapped, and a second opening for the evacuation of the flow of gas, a tank for a cryogenic fluid arranged in the interior of said casing, means for introducing the cryogenic fluid into the interior of said tank, means for evacuating the cryogenic fluid out of said tank, said evacuation means communicating with the upper portion of said tank and forming a trapping surface for said constituent, in which said evacuation means comprise at least one external wall disposed in the vicinity of and at a distance from said tank, forming with the wall of said tank at least one conduit of which one extremity communicates with the upper portion of the tank by means of an opening forming a spillway in said conduit for said cryogenic fluid, at least one plurality of substantially straight tubes arranged at a distance from said external wall, one extremity of which communicates with the other extremity of said conduit while the other extremity communicates with an evacuation manifold for said cryogenic fluid.

2. A cryogenic trap as claimed in claim 1, in which said plurality of tubes are filled at least partially with a porous material.

3. A cryogenic trap as claimed in claim 2, in which said porous material is a conductor of heat.

4. A cryogenic trap as claimed in claim 3, in which said porous material comprises copper turnings.

5. A cryogenic trap as claimed in claim 1, in which said external wall is constituted by a casing surrounding said tank and forming with the wall of said tank an annular conduit, said plurality of tubes being distributed around said tank.

6. A cryogenic trap as claimed in claim 5, in which said first opening is located above said tank and said second opening is at the level of the lower portion of said casing.

7. A cryogenic trap as claimed in claim 1, of the kind comprising means for regulating the temperatures of the trapping surface, in which said regulating means comprise a temperature probe arranged in the interior of the evacuation means for the cryogenic fluid, on the downstream side of said manifold in the direction of circulation of said cryogenic fluid.

* * * * *

UNITED STATES PATENT OFFICE
CERTIFICATE OF CORRECTION

Patent No. 3,788,096     Dated January 29, 1974

Inventor(s) Jacques Brilloit

It is certified that error appears in the above-identified patent and that said Letters Patent are hereby corrected as shown below:

Item [73] "L'Liquide" should read -- L'Air Liquide --; and "L'Etude et L'Exploitation" should read -- l'Etude et l'Exploitation --.

Signed and sealed this 8th day of October 1974.

(SEAL)
Attest:

McCOY M. GIBSON JR.
Attesting Officer

C. MARSHALL DANN
Commissioner of Patents